(12) United States Patent
Vlietinck

(10) Patent No.: US 8,508,539 B2
(45) Date of Patent: Aug. 13, 2013

(54) METHOD AND SYSTEM FOR REAL-TIME VOLUME RENDERING ON THIN CLIENTS VIA RENDER SERVER

(75) Inventor: Jan Vlietinck, Merelbeke (BE)

(73) Assignee: Agfa HealthCare NV, Mortsel (BE)

( * ) Notice: Subject to any disclaimer, the term of this patent is extended or adjusted under 35 U.S.C. 154(b) by 1153 days.

(21) Appl. No.: 12/393,429

(22) Filed: Feb. 26, 2009

(65) Prior Publication Data
US 2009/0225076 A1 Sep. 10, 2009

Related U.S. Application Data

(60) Provisional application No. 61/033,448, filed on Mar. 4, 2008.

(30) Foreign Application Priority Data

Mar. 4, 2008 (EP) .................................. 08102257

(51) Int. Cl.
*G06F 15/16* (2006.01)
*G06T 15/00* (2011.01)
*G06T 1/20* (2006.01)

(52) U.S. Cl.
CPC .............. *G06T 15/005* (2013.01); *G06T 1/20* (2013.01); *G06T 2210/52* (2013.01); *G06T 2200/28* (2013.01)
USPC ........... 345/502; 345/505; 345/503; 345/501; 345/50; 345/504; 345/519; 345/531

(58) Field of Classification Search
CPC ..... G06T 15/005; G06T 1/20; G06T 2210/52; G06T 2200/28
USPC ................. 345/502, 501, 506, 504, 519, 531, 345/505
See application file for complete search history.

(56) References Cited

U.S. PATENT DOCUMENTS 5,764,235 A * 6/1998 Hunt et al. .................... 345/428
6,049,390 A * 4/2000 Notredame et al. ......... 358/1.15
(Continued)

FOREIGN PATENT DOCUMENTS

| WO | 01/84501 A2 | 11/2001 |
| WO | 2008/022282 A2 | 2/2008 |
| WO | WO 2008022282 A2 * | 2/2008 |

OTHER PUBLICATIONS

Stegmaier, Simon, et al., "Widening the Remote Visualization Bottleneck," Proceedings of the 3rd International Symposium on Image and Signal Processing and Analysis, IEEE, vol. 1, pp. 174-179, Sep. 2003.

(Continued)

*Primary Examiner* — Javid A Amini
(74) *Attorney, Agent, or Firm* — Houston & Associates, LLP

(57) ABSTRACT

A method of server site rendering 3D images on a server computer coupled to a client computer wherein the client computer instructs a server computer to load data for 3D rendering and sends a stream of rendering parameter sets to the server computer, each set of rendering parameters corresponding with an image to be rendered; next the render computer renders a stream of images corresponding to the stream of parameter sets and the stream of images is compressed with a video compression scheme and sent from the server computer to the client computer where the client computer decompresses the received compressed video stream and displays the result in a viewing port. The rendering and communication chain is subdivided in successive pipeline stages that work in parallel on successive rendered image information.

23 Claims, 2 Drawing Sheets

(56) References Cited

U.S. PATENT DOCUMENTS

| | | | |
|---|---|---|---|
| 6,559,958 B2* | 5/2003 | Motamed et al. | 358/1.13 |
| 7,602,395 B1* | 10/2009 | Diard | 345/505 |
| 7,777,748 B2* | 8/2010 | Bakalash et al. | 345/505 |
| 7,973,787 B2* | 7/2011 | Vlietinck | 345/419 |
| 2007/0188488 A1* | 8/2007 | Choi | 345/419 |
| 2008/0022282 A1* | 1/2008 | Cherkasova et al. | 718/102 |
| 2008/0117211 A1* | 5/2008 | Vlietinck | 345/424 |
| 2009/0027383 A1* | 1/2009 | Bakalash et al. | 345/419 |
| 2009/0027402 A1* | 1/2009 | Bakalash et al. | 345/505 |
| 2009/0179894 A1* | 7/2009 | Bakalash et al. | 345/422 |
| 2009/0201313 A1* | 8/2009 | Thorn | 345/620 |
| 2009/0225076 A1* | 9/2009 | Vlietinck | 345/419 |
| 2011/0169840 A1* | 7/2011 | Bakalash | 345/505 |

OTHER PUBLICATIONS

European Search Report dated Jul. 25, 2008, from corresponding European Application No. EP 08102257, filed on Mar. 4, 2008.

* cited by examiner

METHOD AND SYSTEM FOR REAL-TIME VOLUME RENDERING ON THIN CLIENTS VIA RENDER SERVER

RELATED APPLICATIONS

This application claims priority to European Patent Application No. EP 08102257.6, filed on Mar. 4, 2008, and claims the benefit under 35 USC 119(e) of U.S. Provisional Application No. 61/033,448, filed on Mar. 4, 2008, both of which are incorporated herein by reference in their entirety.

BACKGROUND OF THE INVENTION

In the field of medical imaging, image modalities keep producing ever larger and larger volume data sets. The latest computed tomography (CT) modalities produce volumes that can be very large. The last couple of year these multi-slice CT scanners have substantially increased their acquisition resolution. Single volume 3D data sets can now be in excess of one Giga Byte (GB) of data.

Also the speed of capturing a single volume scan has increased dramatically. This enables the capture of several volumes of a patient at a time interval of a few seconds. This results in a time sequence of three dimensional (3D) data sets forming four dimensional (4D) data sets, with three spatial dimensions and one time dimension. These 4D sets can be used to examine for example blood flow via contrast fluid perfusion or the mechanical behavior of the heart valves. These 4D data sets can be multiple GB large in size.

In the usual hospital workflow the volumes scanned by the modalities are sent to the Picture Archive and Communication Systems (PACS) server. Radiologist working in their reading rooms retrieve the volumes from the PACS server onto their workstations. Once the volume has been sent from the PACS server to the workstation, the radiologist can start examination of the volume data set with specialized viewing software running on the workstation.

As the amount of volume data has grown to GB of data, retrieving the data from the PACS server to the radiologist's workstation can take a substantial amount of time, i.e., several minutes. The aging Digital Imaging and Communications in Medicine (DICOM) communication protocol standard is also not very efficient to transfer large amounts of data from the PACS server to the workstation. Depending on the network bandwidth the transfer time can take even longer especially for 100 Mbit/s and slower networks. All this time the radiologist has to sit idle waiting for the volume to be available at their workstation.

Because the sheer amount of data to be processed, the radiologist's workstation has to be very powerful and it may require specialized hardware to accelerate the interactive viewing. As hospitals don't upgrade their workstations very often, the workstation of the radiologist may be actually underpowered to view the large data sets efficiently.

People in other departments in the hospital, like for example the referring physician or the operating surgeon, may be interested in reviewing those large volume images as well. These people may have even lower bandwidth network connections to the PACS server and their reviewing computer may have low computation specifications. This may result in very long waiting times before the volume data is sent to the reviewing computer or because of the low computation power it may not even be possible to do the viewing at all.

In order to circumvent the long transfer time of the volume from the PACS server to the viewing computer and the high-end computation power requirements of the viewing computer, a render server configuration can be added to the network. In this configuration the volume to be viewed is first sent from the PACS server to the render server over a high speed network link reducing the long network transfer time. Also the scanning modality can be configured to send the volume directly to the render server so that the volume already is available on the render ready to be viewed.

Instead of rendering the volume on the viewing computer the volume is now rendered on the render server. The viewing computer, called the thin client, instructs the render server what to do via commands it sends over the network from the viewing computer to the render server. The viewing computer tells the render server what volume to render. The viewing computer also tells the render server how to render the volume, like for example the 3D viewing position of the volume. Also the size of the image to render is communicated from the viewing computer to the render server. Once the render server has received all rendering information an image is rendered on the render server and it is sent from the render server to the viewing computer. The viewing computer then displays the received rendered image on the viewing screen.

For each image to be rendered this communication and rendering chain is repeated. So for each viewing interaction of the viewing user with the rendered volume, like for example 3D rotation, a new image is rendered, generating a stream of images. For interactive display typically more than 10 images per second need to be rendered and transferred over the network from the render server to the viewing computer. The size of a typical rendered image can be 1 million pixels, resulting is data size of 3 MB for a color, red, green blue (RGB), image. The rendered image stream thus generates a network load of typically 30 MB per second or 240 Mbit/s. This amount of data is far too much to be passed over typical hospital networks that have no ore than 100 Mbit/s bandwidth. To reduce the amount of rendered image data, images are compressed lossy, with for example JPEG, reducing data by typically a factor of 10. As 24 Mbit/s is still too much data to pass over heavily used hospital networks, the amount of data can be further reduced by for example rendering quarter size images and up scaling the rendered image at the client side. This compression and downscaling is typically only performed on the image stream generated during interactive volume manipulation like for example rotation. When the viewing user stops interacting with the volume a full resolution image is rendered and this still frame is lossless sent from the server to the client.

The render server can serve several viewing clients simultaneously. This causes the required network bandwidth to increase proportional to the number of viewing clients.

The concept of the render server has been known in prior art such as US 2007/0188488.

The rendered images may be treated as a video sequence. A system has been described that implements a rendered video streaming technique in the context of 3D gaming: Stream my game system is one example.

This system allows a game running on a first computer (server) to be viewed and controlled on a single second computer. The first computer generates a continuous video stream even if the viewer on the second computer does not interact with the viewed scene. For game viewing this is required as the rendered scene can change by itself like for example when standing still on a street while looking at a moving car. This continuous video stream puts a continuous load on the network.

Furthermore the system described here requires the application (game) to run on the first computer (server) including any user interface. The complete user interface has to be rendered on the first computer (server) and sent to the second computer via video compression.

SUMMARY OF THE INVENTION

The present invention relates to visualization of volume data. More specifically the invention relates to visualization of medical volume data of patients scanned with 3D modalities like magnetic resonance (MR) imaging, ultrasonography (US), and positron emission tomography (PET).

Still more specifically the invention relates to the visualization of volume data on viewing client computers making use of a render server computer.

The visualization algorithms involve algorithms such as Multiplanar Reconstruction (MPR), Curve Planar Reconstruction (CPR), cine, Maximal Intensity Projection (MIP), volume rendering etc. allowing an interactive and real-time examination of the volume in 2D, 3D or 4D.

It is an aspect of the present invention to provide a server based rendering method that overcomes the above-described disadvantages.

In general, according to one aspect, the invention features, a method of server site rendering of 3D images on a server computer coupled to a client computer wherein a rendering and communication chain is provided for each viewing port of said client computer, the rendering and communication chain being subdivided into successive pipeline stages including query user input for a new image to be rendered,
compute a new set of render parameters according to the user input,
send the set of render parameters from the client to the server,
render a new image on the server according to the render parameter set,
compress the rendered image,
send the compressed rendered image from the server to the client,
decompress the compressed rendered image,
display the rendered image,
wherein simultaneous execution is provided of a number of the pipeline stages and wherein successive pipeline stages work in parallel on successive rendered image information.

Server side volume rendering (rendering of 3D images) may be performed on a server computer coupled to one or more client computers.

In such a set up, the client first sends a message to the server to instruct the server to load a particular volume ready for rendering.

The client computer(s) capture(s) user input such as data entered by means of a keyboard or via a mouse device and computes a set of rendering parameters based on the user input, such as volume selection, 3D transformation matrices, a transfer function look up table, clipping planes, render modes (MIP, DVR, MPR, CPR, ENDO, ...); each set of rendering parameters corresponding with an image to be rendered. The client computer then sends a stream of rendering parameter sets to the server computer. The server computer renders a stream of images corresponding to said stream of parameter sets. This stream of images is compressed by the server with a video compression scheme and sent from the server computer to the client computer where the client computer decompresses the received compressed video stream and displays the result in a viewing port. In one example, the server computer automatically adapts image resolutions, the lossy compression factors and the number of images per second so that the bitrate of the compressed video streams do not exceed a given maximum of allowed bandwidth usage, in which the automatic adapting of said image resolutions by said server computer are steered by preset video quality rules.

In the context of the present invention a viewing port is a window or other viewing area on a display screen.

In general according to another aspect, the invention also features a system for rendering of 3D images including a server computer coupled to a client computer wherein a rendering and communication chain is provided for each viewing port of said client computer, said rendering and communication chain being subdivided into successive pipeline stages including:

query user input for a new image to be rendered,
compute a new set of render parameters according to the user input,
send the set of render parameters from the client to the server,
render a new image on the server according to the render parameter set,
compress the rendered image,
send the compressed rendered image from the server to the client,
decompress the compressed rendered image,
display the rendered image,
wherein simultaneous execution is provided of a number of said pipeline stages and wherein successive pipeline stages work in parallel on successive rendered image information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
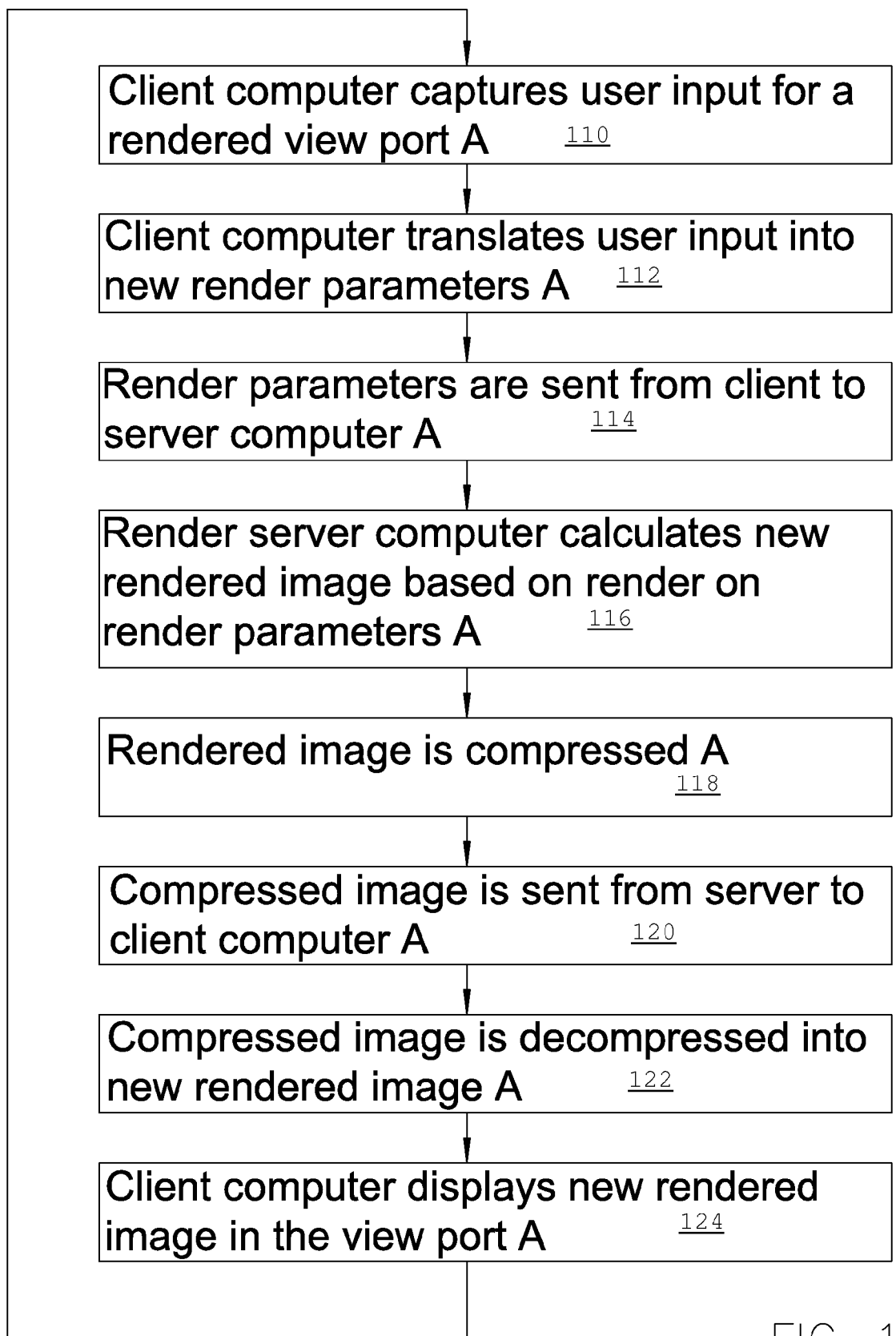
FIG. 1 is a flow diagram showing a non-pipelined communication and rendering chain.

The exemplary set-up described below enables volume viewing and interaction on one or more client computers in one or more viewing ports making use of a render server computer and a compressed rendered video streaming technique. The volume data to view is only present on the server. For each viewing port there is a rendering and communication chain wherein the client sends a stream of rendering parameter sets from the client to the server. Each parameter set corresponds to one image the server has to render. Corresponding to the stream of received parameter sets the render server renders a stream of images. The stream of rendered images is compressed by a video compression scheme. Either lossy video compressions such as for example mpeg2 or mpeg4 or any form of lossless video compression may be applied. The video compressed stream of images is sent from the server to the client. The client decompresses the received video stream and displays the result into the viewing port.

The required network bandwidth is reduced by considering the stream of rendered images as a video sequence and by applying video compression algorithms on the rendered image stream. This rendered video streaming results in far better data compression for similar image quality of typically a factor 5 compared to prior art render servers.

The size of the viewing port is changed at any time with the size of the viewing port being one of the parameters in the render parameter set. The viewing port size change causes a change in size of the rendered images and of the compressed video stream encoding. The compressed video stream encoding takes into account the size change so that decoding allows decompressing the rendered images at the correct size as explained below in the paragraph entitled VRC.

The viewing port size change is a desired feature as the client user can at any time change the size of the viewing port by changing for example the size of a window or by choosing another viewing port layout.

Previous solutions do not use video compression and compress rendered images independently so they need no special mechanism handling viewing port size changes.

The size of the rendered image is adaptively reduced by the server while the size of the viewing port stays unchanged. The server thus renders the image at a reduced resolution. The resulting stream of reduced resolution images is again video compressed and sent to the client which decompresses the video stream. The resulting images are scaled up again to the full resolution of the viewing port prior to display. Upscaling may include bilinear and/or bicubic interpolation. The resized rendered image size can be any smaller size. The compressed video stream encoding takes into account the size change so that decoding allows decompressing the rendered images at the correct size as explained in the paragraph entitled VRC.

The reason for this reduced resolution image streaming is to further reduce the amount of compressed image data and thus network bandwidth usage. During image streaming the reduced resolution image resizing is dynamically changed depending on available network bandwidth, desired number of images per second and the desired image quality. Preferably the allowed bandwidth usage of the compressed video stream per viewing port should not exceed a certain maximum of for example 5 Mbit/s.

The client user may define certain video quality rules such as the number of images per second, for example 10 images per second. In case of lossless video compression the server can automatically resize the rendered image to a reduced resolution in order not to exceed the given maximum allowed bandwidth usage and maintain the given number of images per second. In case of lossy video compression the client user may further specify the desired image quality such as for example medium, high, very high. This image quality in addition to the given number of images per second and given maximum allowed bandwidth usage will determine the reduced resolution image size the server will choose.

VCR

Video compression normally requires that the resolution of the compressed image stream does not change. Video compression relies on the fact that previous images in the image stream can be used to predict the content of the next image to compress. Typically only the difference between the predicted image and the real image is encoded. Compressing this difference enables higher compression versus compressing the whole image. The resolution change has some implications on the video encoding in terms of the type of the compressed images named in video compression parlance I, P and B frames. In a compressed video stream some images are compressed independently of previous images, like for example the first image in the stream these are called I frames. Other images are compressed relative to previous images, these are called P frames. In order to deal with changes in the image resolution due to the reduced resolution changes, the video stream is interrupted and encoded with a new I frame followed by depending P frames. (Another optional type of dependent frames are B frames which are inserted between I and P frames or between two P frames. The B frames depend on both the I and P frames or on both P frames where they are inserted into). Also for each video compressed image its size is encoded into the video stream allowing the decoder to detect size changes and decompress the rendered images at the correct size.

The resolution and image quality may be progressively increased to full resolution and to lossless quality in case the client stops sending new rendering parameter sets. The last sent rendering parameter set is then used to continue sending a stream of images gradually increasing the resolution to full resolution. This requires sending a stream of compressed I frames as the resolution changes from one image to the next image.

As an alternative to sending the video I frames a switch may be made to another type of image compressor that can deal with progressive resolution streaming such as Jpeg2000 in either a lossless or lossy variant. The advantage is better compression versus sending I frames at different resolutions.

In case a new rendering parameter set is received the progressive resolution streaming is interrupted and rendering resumes at the original reduced resolution. When the progressive resolution streaming has reached full resolution the server continues sending new video compressed image now gradually increasing image quality until lossless quality is reached. In case a new rendering parameter set is received, the progressive quality streaming is interrupted and rendering resumes at the original reduced resolution and quality prior to the progressive streaming.

The advantage of the above progressive resolution and quality video streaming is that better compression is possible versus prior art systems that compress successive images independently.

A textual annotation can be drawn in the viewing port giving an indication of the resolution and quality of the displayed image.

Contrary to conventional systems, the application runs not on the server but on the client. This enables only the image viewing ports of the application to be rendered on the server. As the user interface runs on the client there is no communication needed with the server for interaction of the viewer with user interface elements like for example a dialog box. This reduces network load and increases interactivity.

As the text in the user interface elements do not need to be compressed (video compression yields visible artefacts when compressing text), unlike the prior art system, text remains readable in high quality.

Furthermore a typical medical viewing application has many simultaneously displayed image viewing ports. Most of the time the viewing user only interacts with one of the viewing ports. All viewing ports may be rendered independently unlike the prior art system described higher. Thus only the viewing port that is being interacted with needs to be rendered on the render server and updated via rendered video streaming unlike the above-described prior art system. Again this greatly reduces the amount of network traffic.

According to the present embodiment, the communication and rendering chain is subdivided into parallel executed pipeline stages to make more efficient usage of system resources such as network bandwidth, rendering subsystem, compression subsystem, compared to conventional solutions.

The more efficient usage of system resources allows rendering into the client viewing ports at higher image quality and number of images per second versus conventional systems typically enabling an increase of rendered images per second of a factor 2. Thus typically 20 images per second can be rendered instead of 10 images per second enabling a much more fluid interaction of the viewing user with the volume.

Alternatively it allows a less costly server based rendering system at similar image quality and number of images per second versus conventional systems.

The rendering and communication chain can be conceived as a pipeline subdivided into successive pipeline stages such as:

1) capture user input for a new image to be rendered,
2) compute a new set of render parameters according to the user input
3) send the set of render parameters from the client to the server,
4) render a new image on the server according to the render parameter set,
5) compress the rendered image preferably using video compression,
6) send the compressed rendered image from the server to the client,
7) decompress the compressed rendered image,
8) display the rendered image.

This pipelined approach is described in the context of video compressed images sent from server to client but can also be implemented independently of the aspect of the video compression.

Conventional systems execute this pipeline for one image at a time as depicted in FIG. 1. So given a sequence of new images to render A, B, C, The pipeline will first be executed for image A then for image B and so on. So first input will be captured for image A in step 110, a new render parameter set is calculated for image A in step 112 and sent from client to server in step 114, the server renders the new image A in step 116, the server compresses the new image A in step 118, the compressed image A is sent from server to client in step 120, the compressed image A is decompressed by the client in step 122 and displayed into the viewing port in step 124. Next the same sequence is repeated for subsequent images B, C, . . .

This non pipelined way of executing the pipeline means that at any time only one stage of the pipeline is active and that the other pipeline stages remain idle. If each pipeline stage i takes a time ti to execute, the total time to execute the pipeline will be the sum of all ti. So in case we have 8 pipeline stages and each of the pipeline stages takes the following amount of time 20, 10, 40, 100, 50, 40, 50, 20 milliseconds to execute, the total time to execute the pipeline will be 20+10+10+40+ 100+50+40+50+10=330 milliseconds and the throughput of the pipeline will be 3 images per second. The utilization of each pipeline stage in this case is ti/Σ ti in case of our example being 6, 3, 3, 12, 30, 15, 12, 15, 3%.

In order to increase the utilization of the pipeline stages and consequently increase the throughput of the pipeline, the pipeline is preferably used in fully pipelined fashion. In this way each pipeline stage operates on a different image. Also the pipeline stages work simultaneously in parallel on the different images. This is possible when each pipeline stage uses a hardware resource that is not used by any other pipeline stage. The hardware resources are the central processing units (CPUs) in the client and the server which we assume to be multi-core, possibly a graphics processing unit (GPU) for the rendering and the communication network. The cores of the CPUs being used for the compression, decompression, input capture, render parameter set calculation and image display pipeline stages. Possibly a CPU core also is used for rendering otherwise a GPU is used to execute the rendering pipeline stage. In case there is a resource conflict and two pipeline stage share the same hardware resource like is the case for usage of the network in pipeline stages 3) and 6) usage of this resource is time multiplexed. The execution time of the pipeline now is determined by the slowest pipeline stage execution time, or by the sum of the execution times of pipeline stages that share a hardware resource. In our case the slowest pipeline stage is the rendering which takes 100 milliseconds (ms). The network communication time takes 50 ms being 10+40 ms because it is a shared resource. The other pipeline stages can be executed on different CPU cores. So in our example the throughput is now 10 images per second determined by the 100 ms rendering pipeline stage. The pipelined execution of the pipeline has enabled to increase the throughput by a factor 3.3. The utilization of the rendering hardware resource is 100% and of the network hardware resource 50%. The utilization of the CPU core hardware resources are 20, 10, 10% for the first three pipeline stages. The CPU compression core resource has a utilization of 60%.

An advantage of the pipelined execution is thus a more efficient usage of resources enabling to increase the throughput of the rendering and communication chain which results in more images displayed per second in a client viewing port. The increased number of images per second is important for a comfortable viewing of a moving image sequence like for example rotation or panning which are very frequently used in the clinical routine of examining volume data sets and also for example for endoscopic flythrough in more specialized applications like virtual colonoscopy.

Figure 2:
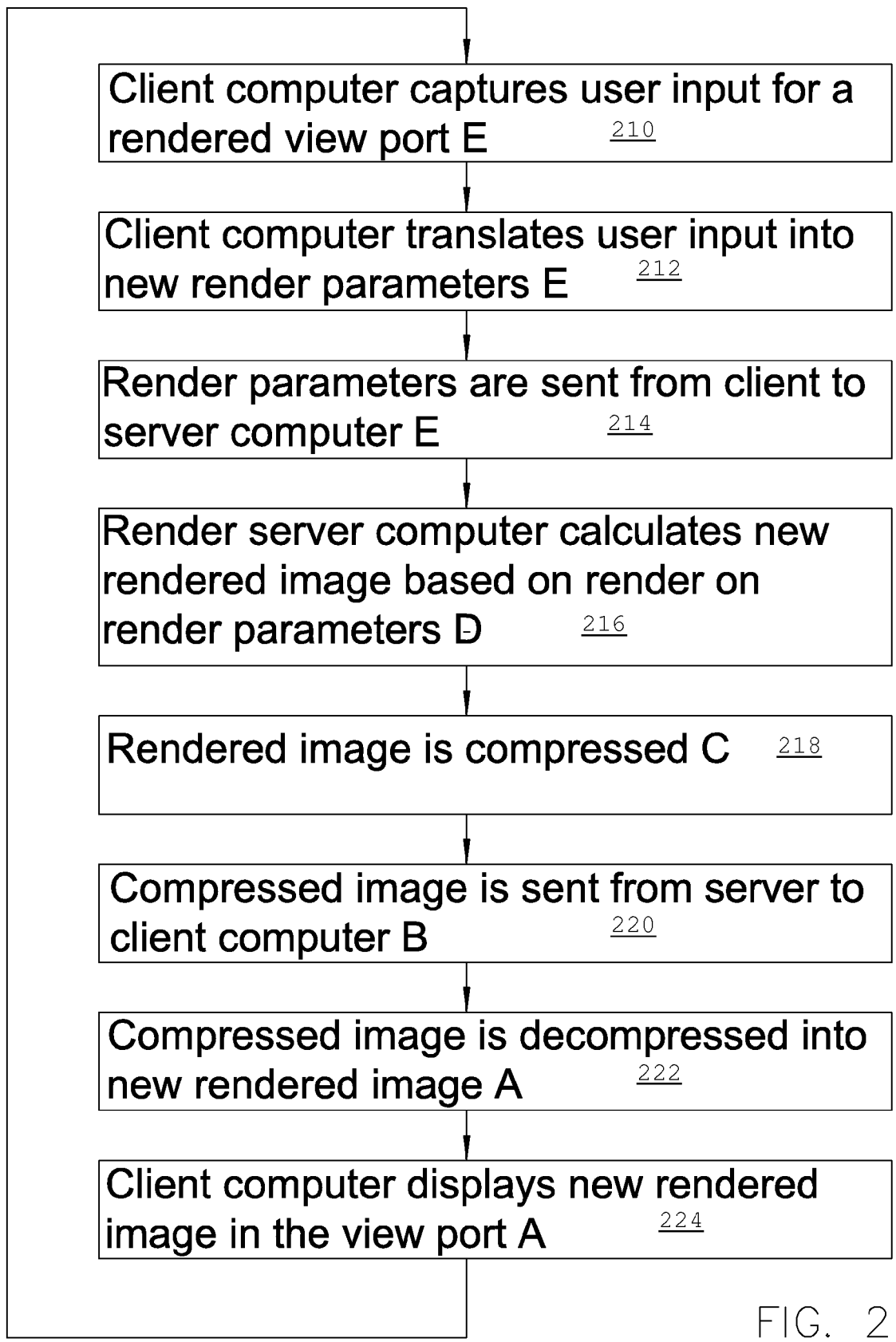
FIG. 2 is a flow diagram showing a pipelined communication and rendering chain.

Instead of deploying the pipeline in a fully pipelined fashion successive pipeline stages are made to work sequentially on the same image. For example the first three pipeline stages are made to work sequentially on the same image (as depicted in FIG. 2). Specifically, in step 210, the client computer captures user input for a rendered view at port E. In step 212, the client computer translates the user input into new render parameters E, and the parameters are sent from the client to the server computer E in step 214. The render server computer calculates new rendered image based on the render on render parameters D, in step 216. The rendered image in compressed C in step 218. Compressed image is sent from server to client computer B in step 220. The compressed image is decompressed into a new rendered image A in step 222. The client computer displays the new rendered image in the view port A in step 224.

This effectively combines these pipeline stages into one pipeline stage. In the described example the new combined pipeline stage takes 40 ms to execute and thus has a 40% utilization of a CPU hardware core. The result of the pipeline stage combining is that the number of pipeline stages is reduced. The throughput of the pipeline can stay the same but the latency of the pipeline is reduced. The latency is the time it takes for an image to be executed by the pipeline. In case of our fully pipelined pipeline the latency is 8 times 100 ms or 800 ms. In case of combining the first 3 stages resulting in 6 pipeline stages the latency is reduced to 600 ms. A small latency is important as to the viewing client user this will determine the response time of the rendering system. After the user enters new user input, a lag of time equal to the pipeline latency will be perceived before the rendered image is displayed.

In this example the latency can be further reduced by combining the two last pipeline stages and pipeline stage 5) and 6) leading to 4 pipeline stages and a pipeline latency of 400 ms. Compared to the non-pipelined execution the latency has increased from 330 to 400 ms but the throughput has gone up from 3 images per second to 10 images per second.

Alternatively to increasing the number of images rendered per second the pipelined execution allows to increase the image quality versus a non pipelined execution. For example the resolution of the rendered image can be increased so that the rendered image increases in size by for example 100%. The rendering pipeline stage then takes 2 times longer to execute resulting in a pipeline throughput of 5 images per second and 100% more image detail, versus 3 images per second and default detail of the non-pipelined execution.

A further advantage and consequence of the increased number of images per second allowed by the pipelined execution is that it reduces the motion different between successive rendered images enabling the video compression algorithms to operate at higher compression efficiency. Thus the increase by a factor of 3.3 of the number of images rendered per second leads to only a moderate increase of the required network bandwidth.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of server site rendering of 3D images on a server computer coupled to client computers wherein a rendering and communication chain is provided for viewing ports of said client computers, said rendering and communication chain being subdivided into successive pipeline stages including:
   query user inputs for new images to be rendered,
   compute new sets of render parameters according to the user inputs,
   send the sets of render parameters from the client computers to the server computer,
   render different images on the server computer according to the render parameter sets,
   compress the rendered images,
   send the compressed rendered images from the server computer to the client computers,
   decompress the compressed rendered images,
   display the rendered image on the client computers,
   wherein simultaneous execution is provided of a number of said pipeline stages, and wherein the successive pipeline stages work simultaneously on successive rendered images of the different images displayed on the viewing ports of the clients.

2. The method according to claim 1 wherein said sets of render parameters comprise the size of said viewing ports, a change of said sizes causing a change in size of the rendered images and a change of compressed video stream encoding.

3. The method according to claim 1 wherein said server computer renders said images at lower resolution and said decompressed images are scaled up to fit the size of said viewing ports.

4. The method according to claim 3 wherein said up-scaling is performed by bilinear and bi-cubic interpolation.

5. The method according to claim 1 wherein said rendered images are compressed using video compression.

6. The method according to claim 5 wherein the video compression is a lossless compression scheme.

7. The method according to claim 5 wherein the video compression is a lossy video compression scheme.

8. The method according to claim 7 wherein said lossy video compression scheme is mpeg2 or mpeg4.

9. The method according to claim 7 wherein said server computer automatically adapts image resolutions, the lossy compression factors and the-number of images per second so that the bitrate of the compressed video streams do not exceed a given maximum of allowed bandwidth usage.

10. The method according to claim 9 wherein said automatic adaptions of said image resolutions by said server computer are steered by preset video quality rules.

11. The method according to claim 10 wherein the client computers configure said video quality rules as a trade-off between desired image quality and desired number of rendered images per second.

12. The method according to claim 11 wherein the client computer specifics computers specify the number of images per second.

13. The method according to claim 12 wherein the client computers further specify lossless compression, the images being automatically reduced in resolution by said server computer to meet the preset maximum allowed bandwidth usage.

14. The method according to claim 12 wherein the client computers further specify lossy compression and the resulting image quality such as low, medium, high, very high, upon which the server computer automatically reduces the image size such as to meet the maximum allowed bandwidth usage.

15. The method according to claim 12 where the user has one or more image quality choices of lossless quality, corresponding to said lossless compression and where the user does not need to specify lossy or lossless compression.

16. The method according to claim 12 where the maximum allowed bandwidth usage of all client viewing ports is automatically adapted according to available network bandwidth.

17. The method according to claim 5 where for each compressed video image the size of the image is encoded into the video stream with in case of a size change the video stream being encoded with a new independent I frame at the new image size followed by depending P or B frames.

18. The method according to claim 1 wherein when the client computers stop sending rendering parameter sets, the server computer continues sending compressed rendered images while progressively increasing the resolution of the rendered image corresponding to the last received rendering parameter set until there is no resolution reduction or until new client rendering parameter sets are received at which point the rendering resumes at the original resolution.

19. The method according to claim 18 wherein when reaching full resolution the server computer continues sending video compressed images while increasing the image quality until lossless quality is reached or when new client rendering parameter sets are received at which point the rendering resumes at the original resolution and quality.

20. The method according to claim 1, where textual annotations are drawn in viewing ports giving an indication of the resolution and quality of the displayed images.

21. The method according to claim 1 wherein the compression is implemented as progressive still frame resolution streaming compression in a lossless or lossy form.

22. The method according to claim 1 wherein successive pipeline stages are combined and replaced by a single pipeline stage, or where additional pipeline stages are inserted into the pipeline or where pipeline stages are split into multiple successive pipeline stages.

23. A system for rendering of 3D images including a server computer coupled to client computers wherein a rendering and communication chain is provided for viewing ports of said client computers, said rendering and communication chain being subdivided into successive pipeline stages including:
   query user inputs for new images to be rendered,
   compute new sets of render parameters according to the user inputs,
   send the sets of render parameters from the client computer to the server computer,
   render different images on the server computer according to the render parameter sets,
   compress the rendered images,
   send the compressed rendered images from the server computer to the client computers,
   decompress the compressed rendered images,
   display the rendered image on the client computers,
   wherein simultaneous execution is provided of a number of said pipeline stages, and wherein the successive pipeline stages work simultaneously on successive rendered images of the different images displayed on the different viewing ports of the clients.

* * * * *